June 11, 1940.　　A. J. MUMMERT　　2,204,025
PISTON EXPANDER
Filed Jan. 6, 1940

INVENTOR:
ARDEN JOHN MUMMERT
BY
ATTORNEY

Patented June 11, 1940

2,204,025

UNITED STATES PATENT OFFICE 2,204,025

PISTON EXPANDER

Arden John Mummert, University City, Mo., assignor to McQuay-Norris Manufacturing Company, St. Louis, Mo., a corporation of Delaware Application January 6, 1940, Serial No. 312,771

7 Claims. (Cl. 309—12)

My invention relates to piston expanders and more particularly to piston expanders designed to increase the diameter of a piston skirt by opening up the skirt at an axially extending slot therein.

Figure 1:
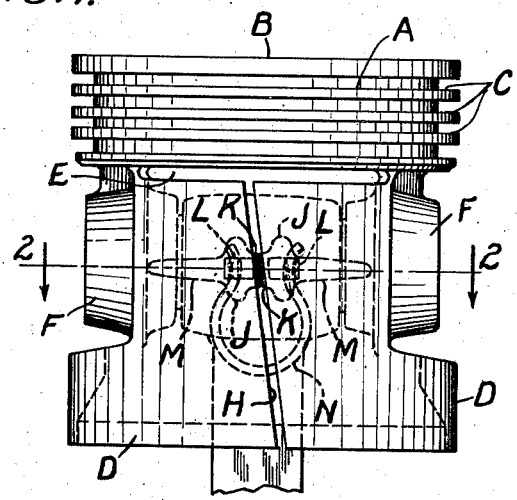

Expanders of this type have taken many forms and shapes, but each of such expanders comprises a spring or other expanding member anchored to the marginal portions of the piston skirt at each side of the slot and arranged to move the edges of the slot away from one another so that the effective dimensions of the piston are increased to compensate for wear. However, expanders of this type have one defect in construction and operation which sometimes is serious. The axial slot in a piston skirt is usually positioned at a point midway circumferentially between the piston pin bosses, as shown in Fig. 1 of the accompanying drawings, and, therefore, with expanders which are adapted to open up the slot by moving the edges thereof away from one another, the resultant effect is to increase the diameter of the piston along the axis of the bosses and the piston skirt assumes an oval shape with the longest dimension being at diametrically opposed points aligned with the axis of the pin bosses and with the shortest dimension being at diametrically opposed points removed approximately ninety degrees from the pin bosses.

It is much better, in most cases, to have the piston expanded evenly so that diameters taken from any points in its circumference will be substantially equal.

Therefore, the objects of my invention are to provide a piston expander of the type described as having an expanding member anchored to the marginal portions of the skirt adjacent the axially extending slot therein and having parts connecting with the expanding member to exert an expansive force outwardly against these marginal portions; and to provide a piston expander which will be simple in design, cheap to manufacture and efficient in operation.

Figure 3:
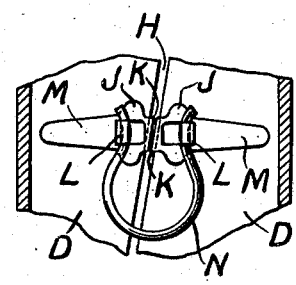
Figure 2:
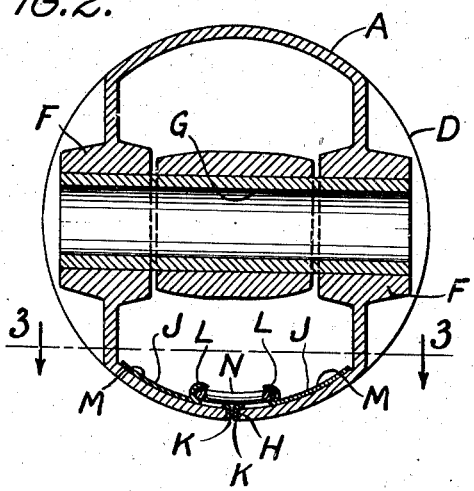
Figure 4:
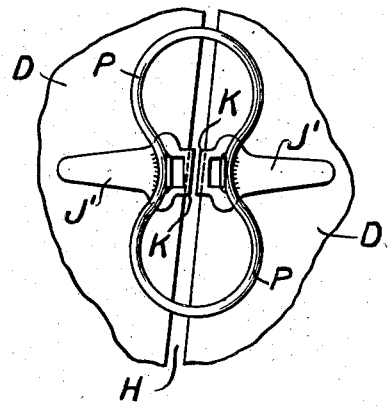

In the accompanying drawings, wherein similar characters are used to designate similar parts, I have shown several simple forms of expanders embodying my invention. Fig. 1 is a view of a piston with an expander embodying my invention assembled therein; Fig. 2 is a cross section along the lines 2—2 in Fig. 1; Fig. 3 is a view of the expander taken along the lines 3—3 in Fig. 2; and Fig. 4 is a detailed view of a slightly modified form of device.

Referring to the figures, the piston A upon which my expander is mounted comprises a head B containing the usual ring grooves C and having depending therefrom a skirt D which is separated throughout a major portion of its periphery from the head by circumferentially extending slots E. The piston also includes the usual bosses F to receive a piston pin upon which is mounted the connecting rod G.

The skirt D contains an axially extending slot H so that in effect the skirt is a broad resilient band or ring having surfaces to glide on the cylinder during reciprocation of the piston.

An expander embodying my invention particularly as shown in Figs. 1 to 3, inclusive, is adapted to be anchored to the marginal portions of the skirt adjacent the slot H and may include a pair of parts J each having a flange K to extend into the slot H to engage one edge of the skirt at the slot and each having a hook L formed thereon by any suitable expedient as by stamping out and bending a tongue in the manner shown in the figures. Each part J also has either integral therewith or carried thereby an elongated resilient member M arranged so that when a part J is anchored to the marginal portion of the skirt the member M will engage the inner surface of the skirt and extend circumferentially thereof from the slot H, as fully shown in Figs. 2 and 3. An expander embodying my invention consists of a pair of parts J, as stated above, and an expanding member which may be the U-shaped spring N, shown in Figs. 1 to 3, inclusive, or may be of any other form, but which in any form engages the parts J by means of the hooks L or by other expedient. When the expander is in place on a piston the expanding member moves the parts J away from one another so that the marginal portions of the skirt adjacent the slot, in turn, are moved away from one another to increase the circumference of the skirt. When this action occurs the elongated resilient members M will engage the inner surfaces of the marginal portions of the skirt and will exert a pressure outwardly against these portions and, in this way, expansion of the skirt will be even in all directions and the elongating effect on the skirt caused by opening up the slot H will be minimized.

In the embodiment shown in Fig. 4 a continuous spring P formed with a double loop is welded to each of the parts J' and the action of the parts is the same.

It will be obvious that the size, shape and arrangement of the various parts may be varied within wide limits without deviating from the spirit of my invention as included in the appended claims. For instance, the expanding member may be anchored in holes drilled in the marginal portion of the skirt away from the slot or it may be anchored in the marginal portions by other expedients. Similarly, the form of expanding member used may be varied. However, if the expander includes members to engage the inner surface of the skirt and to extend circumferentially from the slot and if the parts are arranged so that the circumferentially extending members exert outward pressure against the skirt when the slot H is opened up, the objects of my invention will be fulfilled.

What I claim as new and desire to secure by Letters Patent, is:

1. An expander for a piston skirt having an axially extending slot therein, said expander comprising an expanding member anchored to the marginal portions of said skirt at each side of said slot and adapted to move said portions to open up said slot, said expander also including a member engaging the inner surface of said skirt, extending circumferentially from said slot and adapted and arranged to exert a pressure outwardly against said marginal portion when said expanding member acts to move said marginal portions away from one another.

2. An expander for a piston skirt having an axially extending slot therein, said expander comprising an expanding member anchored to the marginal portions of said skirt at each side of said slot and adapted to move said portions to open up said slot, said expander also including a pair of elongated, resilient members each engaging the inner surface of said marginal portion and extending circumferentially from said slot.

3. An expander for a piston skirt having an axially extending slot therein, said expander comprising an expanding member anchored to the marginal portions of said skirt at each side of said slot and adapted to move said portions to open up said slot, said expander also including a pair of elongated, resilient members each engaging the inner surface of a marginal portion and extending circumferentially from said slot and adapted and arranged to exert a pressure outwardly against said margin portion when said expanding member acts to move said marginal portions away from one another.

4. An expander for a piston skirt having an axially extending slot therein, said expander comprising a spring member anchored to the marginal portions of said skirt at each side of said slot and said expander also including a pair of elongated, resilient members engaging the inner surface of said skirt and extending circumferentially away from said slot.

5. An expander for a piston skirt having an axially extending slot therein, said expander comprising a spring member anchored to the marginal portions of said skirt at each side of said slot and said expander also including a pair of elongated, resilient members engaging the inner surface of said skirt, extending circumferentially from said slot and adapted and arranged to exert a pressure outwardly against said marginal portions when said expanding member acts to move said marginal portions away from one another.

6. An expander for a piston skirt having an axially extending slot therein, said expander comprising a pair of parts each anchored to marginal portions of said skirt adjacent said slot, and each including an elongated member engaging the inner surface of a marginal portion and extending circumferentially from said slot, and an expanding member engaging said parts and arranged to move said parts away from one another.

7. An expander for a piston skirt having an axially extending slot therein, said expander comprising a pair of parts each anchored to marginal portions of said skirt adjacent said slot and each including an elongated, resilient member engaging the inner surface of a marginal portion and extending circumferentially from said slot, and a spring member engaging said parts and arranged to move said parts away from one another, whereby said marginal portions will be moved to open up said slot and said resilient members will exert a pressure outwardly against said marginal portions.

ARDEN JOHN MUMMERT.